(12) United States Patent
Dumais et al.

(10) Patent No.: US 10,353,967 B2
(45) Date of Patent: Jul. 16, 2019

(54) ASSIGNING RELEVANCE WEIGHTS BASED ON TEMPORAL DYNAMICS

(75) Inventors: Susan T. Dumais, Kirkland, WA (US); Jonathan Louis Elsas, Pittsburgh, PA (US); Daniel John Liebling, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1184 days.

(21) Appl. No.: 12/488,594

(22) Filed: Jun. 22, 2009

(65) Prior Publication Data
US 2010/0325131 A1    Dec. 23, 2010

(51) Int. Cl.
*G06F 17/30* (2006.01)
*G06F 16/9535* (2019.01)

(52) U.S. Cl.
CPC .................. *G06F 16/9535* (2019.01)

(58) Field of Classification Search
CPC ......... G06F 17/30864; G06F 17/30616; G06F 17/3064; G06F 17/30038; G06F 17/30265; G06F 17/30675; G06F 17/30696; G06F 17/30707; G06F 17/30; G06F 17/30011; G06F 17/3002; G06F 17/30035; G06F 17/30389; G06F 17/3053; G06F 17/30554; G06F 17/30598; G06F 17/30634; G06F 17/30657; G06F 17/30663; G06F 17/30672; G06F 17/3069; G06F 17/30693; G06F 19/24; G06F 19/707; G06F 1/1632; G06F 21/10; G06F 21/105; G06F 21/577; G06F 2201/80; G06F 3/048; G06F 3/0484; G06F 3/04842; G06F 3/0635; G06F 3/011; G06F 9/546; G06F 11/1451; G06F 11/1453;
(Continued)

(56) References Cited

U.S. PATENT DOCUMENTS 7,363,296 B1    4/2008   Naam et al.
8,924,379 B1 *  12/2014  Kim .................. G06F 17/30657
                                                  707/725
(Continued)

OTHER PUBLICATIONS

Dakka, et al., "Answering General Time-Sensitive Queries", Retrieved at <<http://pages.stern.nyu.edu/~panos/publications/cikm2008.pdf>>, Proceeding of the 17th ACM conference on Information and knowledge management, Oct. 26-30, 2008, pp. 1-2.
(Continued)

*Primary Examiner* — Amanda L Willis
(74) *Attorney, Agent, or Firm* — Medley, Behrens & Lewis, LLC (57) ABSTRACT

A system described herein includes a receiver component that receives a first dataset, wherein the first dataset comprises temporal dynamics pertaining to a document that is accessible by a search engine, wherein the temporal dynamics comprise an identity of a term corresponding to the document and an indication that the term has been subject to change over time. The system also includes a weight assignor component that assigns a relevance weight to the document based at least in part upon the temporal dynamics pertaining to the document, wherein the relevance weight is utilized by the search engine to assign a ranking to the document with respect to at least one other document when the search engine retrieves the document.

18 Claims, 8 Drawing Sheets

(58) Field of Classification Search
CPC ........... G06F 11/1458; G06F 17/30858; G06F 17/30247; G06F 17/30256; G06F 17/30268; G06F 17/3028; G06F 17/30542; G06F 17/30876; G06F 17/2247; G06F 17/2765; G06F 17/277; G06F 17/2785; G06F 17/30053; G06F 17/30076; G06F 17/30091; G06F 17/30097; G06F 17/30117; G06F 17/30156; G06F 17/30171; G06F 17/30235; G06F 17/30253; G06F 17/30277; G06F 17/30289; G06F 17/3068
USPC ......... 707/706, 999.003, 728–730, 748–751, 707/725
See application file for complete search history.

(56) References Cited

U.S. PATENT DOCUMENTS

| | | | |
|---|---|---|---|
| 2003/0115187 | A1* | 6/2003 | Bode et al. ........................ 707/3 |
| 2003/0220913 | A1* | 11/2003 | Doganata .......... G06F 17/30867 |
| 2005/0154686 | A1 | 7/2005 | Corston et al. |
| 2005/0165750 | A1* | 7/2005 | Shakib et al. .................... 707/3 |
| 2007/0100817 | A1* | 5/2007 | Acharya ........... G06F 17/30864 |
| 2007/0118498 | A1 | 5/2007 | Song et al. |
| 2007/0185858 | A1* | 8/2007 | Lu ..................... G06F 17/30864 |
| 2008/0033939 | A1 | 2/2008 | Khandelwal |
| 2008/0256051 | A1* | 10/2008 | Liu et al. .......................... 707/5 |
| 2009/0049037 | A1 | 2/2009 | Gross |
| 2009/0049041 | A1 | 2/2009 | Tareen et al. |
| 2009/0319518 | A1* | 12/2009 | Koudas et al. ................... 707/5 |

OTHER PUBLICATIONS

Last, Mark, "Computing Temporal Trends in Web Documents", Retrieved at <<http://www.eusflat.org/publications/proceedings/EUSFLAT-LFA_2005/papers/S116-09.pdf>>, Proceedings of the Fourth Conference of the European Society for Fuzzy Logic and Technology, 2005, pp. 615-620.

Adar, et al., "Zoetrope: Interacting with the Ephemeral Web", Retrieved at <<http://www.adobe.com/technology/pdfs/uist08zoetrope.pdf>>, Proceedings of the 21st annual ACM symposium on User interface software and technology, Oct. 19-22, 2008, pp. 1-10.

Adar, et al., "Large Scale Analysis of Web Revisitation Patterns", Retrieved at <<http://www.cond.org/chi1159-adar.pdf>>, Proceeding of the twenty-sixth annual SIGCHI conference on Human factors in computing systems, Apr. 5-10, 2008, pp. 1-10.

Bolin, et al., "Automation and Customization of Rendered Web Pages", Retrieved at <<http://groups.csail.mit.edu/uid/projects/chickenfoot/uist05.pdf>>, Proceedings of the 18th annual ACM symposium on User interface software and technology, Oct. 23-26, 2005, pp. 1-10.

Cho, et al., "The Evolution of the Web and Implications for an Incremental Crawler", Retrieved at <<http://oak.cs.ucla.edu/~cho/papers/cho-evol.pdf>>, Proceedings of the 26th International Conference on Very Large Data Bases, Sep. 10-14, 2000, pp. 1-21.

Cronen-Townsend, et al., "Predicting Query Performance", Retrieved at <<http://maroo.cs.umass.edu/pdf/IR-250.pdf>>, Proceedings of the 25th annual international ACM SIGIR conference on Research and development in information retrieval, Aug. 11-15, 2002, pp. 1-8.

Dontcheva, et al., "Changes in Webpage Structure over Time", Retrieved at <<http://www.cs.washington.edu/homes/mirad/research/pubs/TR2007-04-02.pdf>>, Proceedings of the 16th International Conference on World Wide Web, WWW 2007, May 8-12, 2007, pp. 1-10.

Douglis, et al., "Rate of Change and Other Metrics: A Live Study of the World Wide Web", Retrieved at <<http://citeseerx.ist.psu.edu/viewdoc/download;jsessionid=226B7FCCF6B486FD81F0BC7444089870?doi=10.1.1.31.5563&rep=rep1&type=pdf>>, Proceedings of the USENIX Symposium on Internet Technologies and Systems on USENIX Symposium on Internet Technologies and Systems, Dec. 8-11, 1997, pp. 1-13.

Fetterly, et al., "A large-scale study of the evolution of Web pages.", Retrieved at <<http://sewm.pku.edu.cn/src/paradise/reference/html-purifier/2003-WWW-A%20Large-Scalec%20Study%20of%20the%20Evolution%20of%20Web%20Pages.pdf>>, In Proceedings of the 12th International World Wide Web Conference, May 20-24, 2003. pp. 1-10.

Friedman, et al., "Additive Logistic Regression: A Statistical View of Boosting", Retrieved at <<http://citeseerx.ist.psu.edu/viewdoc/download?doi=10.1.1.51.9525&rep=rep1&type=pdf>>, Annals of statistics, vol. 28, No. 2, 2000, pp. 1-45.

Grandi, Fabio, "Introducing an Annotated Bibliography on Temporal and Evolution Aspects in the World Wide Web", Retrieved at <<http://www.sigmod.org/record/issues/0406/A2.twbib_short.pdf>>, ACM SIGMOD Record, vol. 33, No. 2, Jun. 2004, pp. 1-3.

Koehler, Wallace, Web page change and persistence: A four-year longitudinal study. http://ombres.ath.cx:8080/document/RP_NTIC/ntic/JASIST/Koehler,2002.pdf>>, Journal of the American Society for Information Science and Technology, vol. 53, No. 2, Jan. 2002, pp. 162-171.

Kwon, et al., "Effective Criteria for Web Page Changes", Retrieved at <<http://www.springerlink.com/content/f6q21x3k7148r72g/fulltext.pdf>>, Frontiers of WWW Research and Development—APWeb 2006, LNCS 3841, pp. 837-842.

Ntoulas, et al., "What's New on the Web? The Evolution of the Web from a Search Engine Perspective", Retrieved at <<http://www.cs.cmu.edu/~olston/publications/webstudy.pdf>>, Proceedings of the 13th international conference on World Wide Web, May 17-22, 2004, pp. 1-12.

Olston, et al., "Recrawl Scheduling based on Information Longevity", Retrieved at <<http://www.cs.cmu.edu/~spandey/www08.pdf>>, Proceeding of the 17th international conference on World Wide Web, Apr. 21-25, 2008, pp. 1-10.

Pitkow, et al., "Life, Death, and Lawfulness on the Electronic Frontier", Retrieved at <<http://citeseerx.ist.psu.edu/viewdoc/download;jsessionid=95802D257BC6E4BA94D8A90AD97B9CFC?doi=10.1.1.39.6606&rep=rep1&type=pdf>>, Proceedings of the SIGCHI conference on Human factors in computing systems, Mar. 22-17, 1997, pp. 383-390.

Ramaswamy, et al., "Automatic Detection of Fragments in Dynamically Generated Web Pages", Retrieved at <<http://citeseerx.ist.psu.edu/viewdoc/download?doi=10.1.1.4.8513&rep=rep1&type=pdf>>, Proceedings of the 13th international conference on World Wide Web, May 17-20, 2004, pp. 1-12.

Sebastian, Fabrizio, "Machine Learning in Automated Text Categorization", Retrieved at <<http://www.isti.cnr.it/People/F.Sebastiani/Publications/ACMCS02.pdf>>, ACM Computing Surveys, vol. 34, No. 1, Mar. 2002, pp. 1-47.

Selberg, et al., "On the Instability of Web Search Engines", Retrieved at <<http://citeseerx.ist.psu.edu/viewdoc/download?doi=10.1.1.36.3459&rep=rep1&type=pdf>>, In Proceedings of the Recherche d'Informations Assiste par Ordinateur (RIAO '00), Apr. 12-14, 2000, pp. 1-14.

Teevan, et al., "Information Re-Retrieval: Repeat Queries in Yahoo's Logs", Retrieved at <<http://people.csail.mit.edu/teevan/work/publications/papers/sigir07.pdf>>, Proceedings of the 30th annual international ACM SIGIR conference on Research and development in information retrieval, Jul. 23-27, 2007, pp. 1-8.

Adar, et al., "Resonance on the Web: Web Dynamics and Revisitation Patterns", Retrieved at <<http://research.microsoft.com/pubs/79631/chi09-resonance.pdf>>, Proceedings of the 27th international conference on Human factors in computing systems, Apr. 4-9, 2009, pp. 1-10.

Adar, et al., "The Web Changes Everything: Understanding the Dynamics of Web Content", Retrieved at <<http://turing.cs.washington.edu/papers/wsdm09-adar.pdf>>, Proceedings of the Second ACM International Conference on Web Search and Data Mining, Feb. 9-12, 2009, pp. 1-10.

Alonso, et al., "Clustering of Search Results using Temporal Attributes", Retrieved at <<http://portal.acm.org/ft_gateway.cfm?id=1148273&type=pdf&coll=GUIDE&dl=GUIDE&CFID=26334991

(56) References Cited

OTHER PUBLICATIONS

&CFTOKEN=94208931>>, Proceedings of the 29th annual international ACM SIGIR conference on Research and development in information retrieval, Aug. 6-11, 2006, pp. 597-598.

Anick, et al., "Versioning a Full-Text Information Retrieval System", Retrieved at <<http://portal.acm.org/ft_gateway.cfm?id=133183&type=pdf&coll=GUIDE&dl=GUIDE&CFID=26335153&CFTOKEN=29563571>>, Proceedings of the 15th annual international ACM SIGIR conference on Research and development in information retrieval, Jun. 21-24, 1992, pp. 98-111.

Berberich, et al., "A Time Machine for Text Search", Retrieved at <<http://domino.mpi-inf.mpg.de/intranet/ag5/ag5publ.nsf/0/a6b6f424ae7674f9c12572b90021a0b8/$File/sigir2007.pdf>>, Proceedings of the 30th annual international ACM SIGIR conference on Research and development in information retrieval, Jul. 23-27, 2007 pp. 1-8.

Broder, et al., "Syntactic Clustering of the Web", Retrieved at <<http://www.hpl.hp.com/techreports/Compaq-DEC/SRC-TN-1997-015.pdf>>, Jul. 25, 1997, pp. 1-13.

Diaz, et al., "Using Temporal Profiles of Queries for Precision Prediction", Retrieved at <<http://maroo.cs.umass.edu/pub/web/getpdf.php?id=479>>, Proceedings of the 27th annual international ACM SIGIR conference on Research and development in information retrieval, Jul. 25-29, 2004, pp. 1-7.

Jones, et al., "Temporal Profiles of Queries", Retrieved at <<http://www.cs.cmu.edu/afs/cs/user/rosie/www/papers/jones-tois-2007.pdf>>, ACM Journal Name, vol. V, No. N, 2000, pp. 1-32.

Lee, et al., "Automatic Identification of User Goals in Web Search", Retrieved at <<http://www2005.org/cdrom/docs/p391.pdf>>, Proceedings of the 14th international conference on World Wide Web, May 10-14, 2005, pp. 391-400.

Li, et al., "Time-based Language Models", Retrieved at <<http://ciir.cs.umass.edu/pubfiles/ir-297.pdf>>, Proceedings of the twelfth international conference on Information and knowledge management, Nov. 3-8, 2003, pp. 1-7.

Ogilvie, et al., "Combining Document Representations for Known-Item Search", Retrieved at <<http://www.cs.cmu.edu/~pto/papers/SIGIR_2003_COMB_DOCREP.pdf>>, Proceedings of the 26th annual international ACM SIGIR conference on Research and development in information retrieval, Jul. 28-Aug. 1, 2003, pp. 1-8.

Zhai, et al., "A Study of Smoothing Methods for Language Models Applied to Information Retrieval", Retrieved at <<http://sifaka.cs.uiuc.edu/czhai/pub/sigir2001-smooth.pdf>>, Proceedings of the 24th annual international ACM SIGIR conference on Research and development in information retrieval, 2001, pp. 1-9.

* cited by examiner

ASSIGNING RELEVANCE WEIGHTS BASED ON TEMPORAL DYNAMICS

BACKGROUND

Advances in computing technologies have allowed individuals and companies to collect, store and maintain incredibly large amounts of information in the form of electronic documents, images, etc. Typically this information is organized through use of file folders, wherein a name and location of a file folder may correspond to a particular schema for organizing documents. To locate a certain document, a user can traverse through one or more file folders until a folder that includes the desired information is located.

Search tools can also be utilized in connection with locating certain information. For example, the user can enter a search query into a query field and cause a search algorithm to execute over contents in a selected drive/folder, etc. The user may then be provided with documents that have been located through utilization of the search algorithm.

Search engines have also been designed in an effort to aid in locating information available by way of the Internet. Again, a user can enter a search query into a search engine and the search engine can provide the user with a ranked list of results, wherein a most relevant result (as determined by the search engine) is displayed most prominently to the user while other less relevant results are displayed less prominently to the user. The user can then review the search results and select a search result that the user believes to be pertinent to informational needs of the user. Additionally or alternatively, the user may provide the search engine with a new search query.

Due to the ever increasing amount of information that can be stored (e.g., locally on a personal computer, for example, or on servers accessible by way of the Internet), locating information that meets informational needs of a user is often a difficult task. Providing relevant results to a user with respect to a query, however, is important to attract new users to search products (e.g., desktop and Internet search engines) as well as retain existing searchers.

SUMMARY

The following is a brief summary of subject matter that is described in greater detail herein. This summary is not intended to be limiting as to the scope of the claims.

Described herein are various technologies pertaining to utilizing temporal dynamics of documents to assign relevance scores to the documents. Searchable documents, such as web documents (e.g., HTML documents) tend to be dynamic, in that content on at least some pages alters over time. For instance, a homepage for a newspaper may include content that changes numerous times a day. In another example, an online auction site or marketplace site may alter many times over the course of an hour. Some alterations can be substantial and significant for information seekers—new stories appearing on a homepage, new comments on a blog post, a new product for sale on a marketplace website, etc, while others may be less significant, such as a change in a visitation counter, advertising content, or formatting changes. Aspects described herein take into consideration temporal dynamics of searchable documents (e.g., HTML documents, word processing documents, amongst other documents) when ranking documents with respect to an issued query, wherein temporal dynamics refers to alterations to content pertaining to documents over time.

Pursuant to an example, a first score can be assigned to a document independent of a query, wherein the first score is based at least in part upon temporal dynamics of the document. For instance, an identity of a particular term that is subject to change in the document can be ascertained, and rate of change of such term can be taken into consideration when determining the first score. Further, nature of one or more terms that have altered over time can be considered when determining the first score, such as whether the term is included in the document, whether the term is a tag assigned to the document by a user, whether the term is included in anchor text of the document, etc. The first score may then be used to rank the document with respect to at least one other document in a ranked list of documents.

Additionally or alternatively, a second score can be assigned to the document, wherein the second score is dependent upon the content and/or nature of the query. For instance, a received query can be classified as either information seeking or navigational. A navigational query is a query that is employed by users who want to navigate to a particular document (e.g., a homepage of a particular newspaper). An information seeking query is a query that is employed by users to locate particular (e.g., recent) information. The second score can be assigned to the document based at least in part upon the classification of the query. Furthermore, temporal dynamics of the document may also be considered when determining the second score. The document may then be ranked within a ranked list of documents based at least in part upon the second score.

Other aspects will be appreciated upon reading and understanding the attached figures and description.

DETAILED DESCRIPTION

Various technologies pertaining to assigning weights to documents based at least in part upon temporal dynamics corresponding thereto will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

Figure 1:
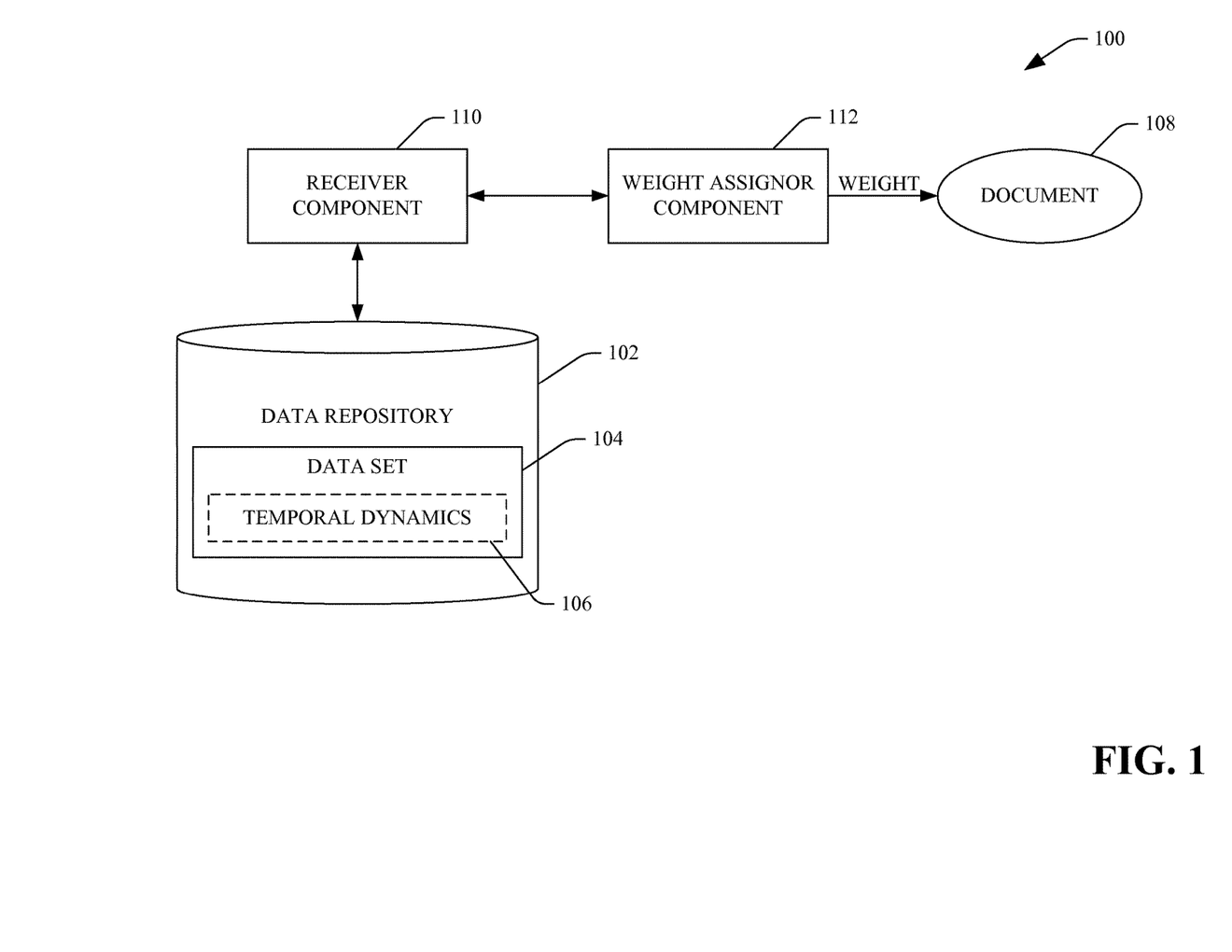
FIG. 1 is a functional block diagram of an example system that facilitates assigning a weight to a document based at least in part upon temporal dynamics pertaining to the document.

With reference to FIG. 1, an example system 100 that facilitates assigning weights to documents based at least in part upon temporal dynamics corresponding thereto is illustrated. As used herein, a document may be an HTML document, a word processing document, a spreadsheet document, a presentation document, or any other suitable document with searchable content therein. For instance, a document may be an image, and temporal dynamics of the image may refer to alterations in content of the image (including changes in colors of the image). Moreover, temporal dynamics can refer to alterations in documents over a period of time or periods of time. Such alterations may be alterations of terms or phrases in documents (e.g., in the readable content of documents), changes of anchor text in a document, alterations of tags assigned to documents, or other suitable alterations that may occur over time. Further, the term temporal dynamics is intended to encompass nature of alterations in a document, changes in position of text or imagery in a document, queries utilized to retrieve the document, etc.

The system 100 comprises a data repository 102 that includes a dataset 104 that comprises or is indicative of temporal dynamics 106 pertaining to at least one document 108, wherein the document 108 is accessible through use of a search engine. The search engine may be a web-based search engine, a desktop search tool, an enterprise search tool, or other suitable search tool. While not shown, the data repository 102 may additionally comprise the at least one document 108 and/or one or more representations thereof (e.g., a signature that is representative of the document). As indicated above, temporal dynamics 106 of the document 108 can include information pertaining to alterations of the document over time, including but not limited to an amount (volume) that a document changes over time, frequency/rate that a document changes over time, changes in terms included in the document 108, nature of changes made to the document 108, rate of change of certain terms in the document 108 or associated with the document 108, etc. Furthermore, the temporal dynamics 106 may include an identity of a term corresponding to the document 108 as well as an indication that the term has been subject to change over some period of time or different periods of time.

The system 100 also includes a receiver component 110 that is configured to receive the dataset 104. For instance, the receiver component 110 can access the data repository 102 and retrieve the dataset 104 upon receipt of a command from a user, periodically, as a background procedure, etc. In another example, the receiver component 110 may be a port on a computing device that is configured to receive the dataset 104 from the data repository 102.

A weight assignor component 112 is in communication with the receiver component 110 and can assign a relevance weight to the document 108 based at least in part upon the temporal dynamics 106 pertaining to the document 108. The relevance weight assigned to the document 108 can be utilized by the search engine to rank the document 108 with respect to at least one other document when the search engine retrieves the document responsive to receipt of a query. As will be described in greater detail below, the weight assigned to the document 108 may be independent of the query utilized by the search engine to retrieve the document 108 (herein referred to as a "document prior"), may be based at least in part upon (dependent upon) the query utilized by the search engine to retrieve the document, or may be a combination of a query independent and query dependent weight. For instance, the weight assignor component 112 can assign a document prior to a document based at least in part upon volume and/or frequency of changes of content (e.g., text, images, ...) in the document. In another example, the weight assignor component 112 can assign a query dependent score to the document, wherein the query dependent term can be based at least in part upon a classification of terms in vocabulary of the document into different temporal classes (or represented by a continuous function) based upon temporal characteristics of the terms in the document. Thereafter, when a query is given, one or more scores can be assigned to the document for one or more of the temporal classes. The weight assignor component 112 can further combine such scores into a score for the document. Example mechanisms for generating query independent and query dependent scores are described in greater detail herein.

Further, the weight assignor component 112 can take a plurality of factors/parameters into consideration when assigning the relevance weight(s) (scores) to the document 108. For example, the weight assignor component 112 can take content of the query into consideration, wherein the query includes at least one term that corresponds to the document 108, and wherein the at least one term is subject to alteration over time. Furthermore, the weight assignor component 112 can determine a nature of the at least one term and take such nature into consideration when assigning the weight to the document 108. For instance, the at least one term may be included in the content of the document 108 (e.g., configured for viewing by a viewer of the document 108), may be anchor text that corresponds to the document 108, may be a term in a query utilized by the search engine to retrieve the document 108, may be a tag assigned by a reviewer of the document 108, etc. For example, terms of queries utilized to locate certain documents may change over time, and such changes over time can be leveraged in connection with weighting documents.

Still further, the weight assignor component 112 can assign the weight to the document 108 based at least in part upon rate of change of the at least one term in the document 108 over a threshold period of time. In yet another example, the dataset 104 can include data indicative of which portions of the document 108 have altered over time, and the weight assignor component 112 can assign the weight to the document 108 based at least in part upon the data that is indicative of which portions of the document have altered over time. Additional detail pertaining to one or more example embodiments of the weight assignor component 112 is provided below.

Figure 2:
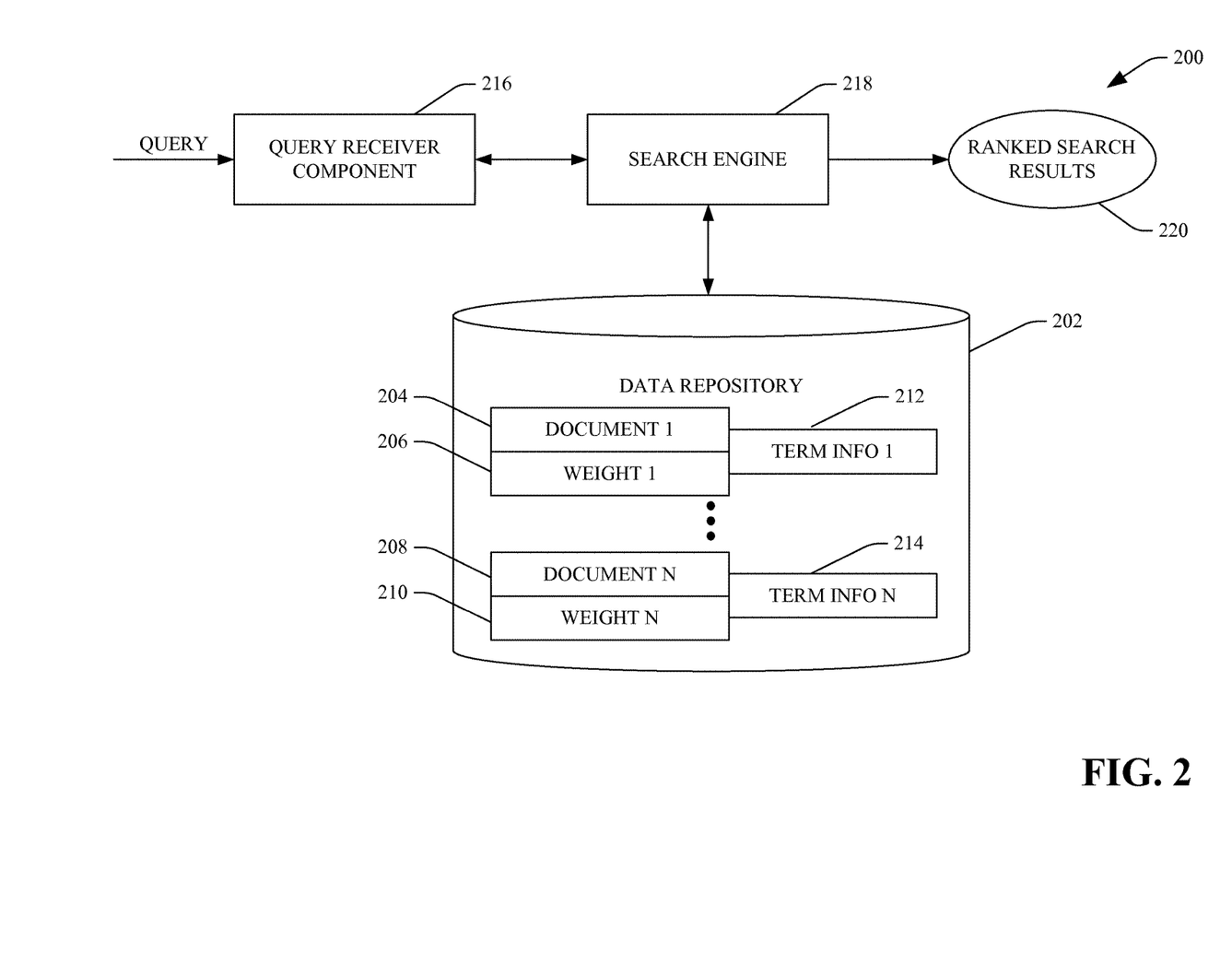
FIG. 2 is a functional block diagram of an example system that facilitates searching over a plurality of documents upon receipt of a query.

Referring now to FIG. 2, an example system 200 that facilitates ranking documents based at least in part upon a weight or weights assigned thereto is illustrated. The system 200 includes a data repository 202 that comprises a plurality of documents and weights that correspond thereto. For example, the data repository 202 is shown to include a first document 204 that has a first weight 206 assigned thereto through an Nth document 208 that has an Nth weight 210 assigned thereto. The weights 206 and 210 can be reflective of temporal dynamics that correspond to the documents 204 and 208, respectively. Additionally, the data repository 202 can include first term information 212 that corresponds to the first document 204 and Nth term information 214 that corresponds to the Nth document 208. The term information 212 and 214 can include data that identifies terms in the documents 204 and 208 as well as a weight that is indicative of temporal dynamics corresponding to the terms in the documents 204 and 208. Thus, in an example, the weights 206 and 210 can be independent of a query (document priors), and the term information 212 and 214 can be utilized in connection with determining a weight that is dependent upon a query (e.g., computed at time of receipt of a query). Additionally, query independent weights and query dependent weights can be combined upon receipt of a query.

The system 200 additionally includes a query receiver component 216 that receives a query issued by a user. For instance, the query receiver component 216 can be or include a graphical user interface that facilitates receipt of a query issued by the user. As will be shown and described herein, the query receiver component 216 can be in communication with the weight assignor component 112 (FIG. 1), and the weight assignor component 112 can assign weights to documents based at least in part upon content/ nature of the received query.

A search engine 218 is in communication with the query receiver component 216, and can execute the query received by the query receiver component 216 over contents of the data repository 202. The search engine 218 may be or include a web-based search engine, a desktop search tool, a search tool configured to execute over documents in an email server, or other suitable search tool. The search engine 218 can output a list of ranked search results 220 upon executing the query over the contents of the data repository 202. The ranked search results 220 include a plurality of search results that are ranked in an order based upon their determined relevance to the information need of the user that issued the query. The search engine 218 can take the weights 206 and 210 into consideration when outputting the ranked search results 220. Furthermore, the term information and query can be taken into consideration when outputting the ranked search results 220. Thus, the position of a document in the ranked search results 220 can be based at least in part upon temporal dynamics corresponding to the document.

Figure 3:
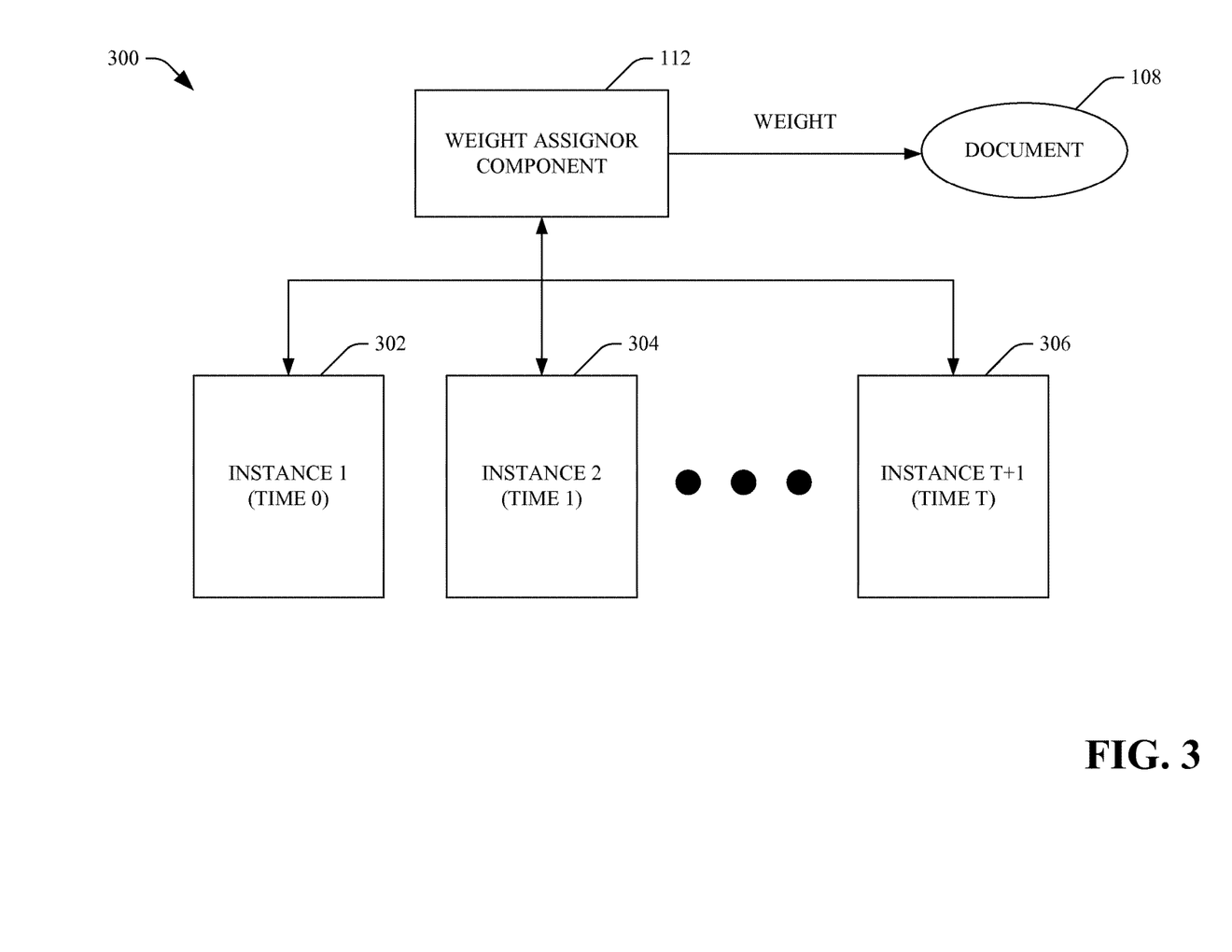
FIG. 3 is a functional block diagram of an example system that facilitates assigning a weight to a document based at least in part upon temporal dynamics pertaining to the document.

Now referring to FIG. 3, an example system 300 that facilitates generating weights for documents based at least in part upon temporal dynamics corresponding thereto is illustrated. The system includes the weight assignor component 112 that has access to multiple instances of a document at various times. Specifically, the weight assignor component 112 has access to a first instance of the document 302 that corresponds to a zeroth point in time, a second instance of the document 304 that corresponds to a first point in time, and a T+1 instance of the document that corresponds to an Tth point in time. The points in time can be equidistant from one another, can have a random or pseudo-random distribution, can be determined based upon accesses to a server to update the document, etc. As indicated above, content of the document may change over time, and the instances of such document 302-306 can, upon inspection, reflect changes made to the document (e.g., terms in the document, anchor text pertaining to the document, . . . ) over time. Other manners of indexing documents to capture temporal dynamics of documents over time are contemplated and intended to fall under the scope of the hereto-appended claims.

The weight assignor component 112 can, for example, use a language modeling framework in connection with assigning a weight to the document. Other retrieval models, such as probabilistic models, vector space models, or learned combinations of features could also be used for retrieval and ranking. Using the language modeling framework, the weight assignor component 112 can differentially weight portions (content) of the document 108 separately or the entirety of the document 108 based upon temporal dynamics of the document 108.

As described above, the instances of the document can pertain to different points in time (time slices). A vector of term frequencies can be representative of terms in the document 108 over the time slices:

$$n(q,D) = \langle n(q,D^{(0)}), n(q,D^{(1)}), \ldots, n(q,D^{(T)}) \rangle$$

where n(q, D) is a distribution of a particular term in the document 108 for a query or queries utilized to retrieve the document 108, q is a term included in a query issued by users to retrieve the document 108, D is the document 108, n(q, D) is a term frequency of the term q in the document D at a particular time slice, and the superscripts refer to the time slices that correspond to the instances 302-306 of the document 108.

Accordingly, the sum of term frequencies across all time slices can be represented as follows:

$$N(q, D) = \sum_{i=0}^{T} (q, D^{(i)}).$$

Additionally, a number of non-zero entries in the term frequency vector can be represented as follows:

$$c(q, D) = \sum_{i=0}^{T} 1 \ (n(q, D^i) > 0),$$

where 1 (•) is a an indicator function equal to one when • is true and zero otherwise.

In an example, the weight assignor component 112 can differentially weight terms in the document 108, and can identify several classes of terms with different temporal characteristics. For instance, the weight assignor component 112 can identify multiple classes of terms that correspond to different temporal characteristics of the terms. While examples below describe utilization of three classes of terms, it is to be understood that any other suitable number of classes of terms can be employed. Thus, for a query issued to seek information on recent events, it may be advantageous to place a high weight on terms recently entered into the vocabulary of the document 108. Navigational queries (e.g., queries where the user is searching for a particular page, such as a homepage of a newspaper) may be better served by content that is present in a majority of the instances 302-306 of the document 108 over time. Such content may be likely to be more reflective of the ongoing central document of the topic. The classes of terms can represent lengths of time that a term is present in the document 108 over time (e.g., long-term, mid-term, and short-term). Different language models may then be utilized by the weight assignor component 112 from each of the term classes. For instance, in an example, the following three language models can be employed by the weight assignor component 112: $P(q|D_L)$, $P(q|D_M)$, and $P(q|D_S)$. The three different language models can be conceptualized as being derived from three virtual documents: a first virtual document that includes terms appearing in a small number of time slices, a second virtual document that includes terms appearing in a large number of time slices, and a third virtual document that includes terms appearing in some of the time slices. Taking the three virtual documents together gives the union of the document 108 across all time slices.

Thus, a document language model P(q|D) can be based upon a mixture of the models of the three aforementioned models, and can be represented as follows:

$$P(D|Q) \approx P(D) \Pi_{q \in Q} P(Q|D)^{n(q,Q)} \quad (1)$$

and where the following mixture model can be utilized to estimate query term likelihoods:

$$P(q|D) = \lambda_L P(q|D_L) + \lambda_M P(q|D_M) + \lambda_S P(q|D_S) \quad (2)$$

where P(D|Q) refers to a weight that can be assigned to the document 108 for a particular query Q, P(D) refers to a weight of the document 108 that is independent of the query, P(Q|D) refers to a weight of the document 108 that is dependent upon the query, and λ is a weight that can be learned/ascertained, where $\lambda_L$, $\lambda_M$, and $\lambda_S \in [0,1]$ and $\lambda_L + \lambda_M + \lambda_S = 1$. The weight λ will be described in greater detail herein.

While the above has referred to three term classes, it is to be understood that any suitable number of term classes can be employed in connection with assigning weights to documents based at least in part upon temporal dynamics corresponding to the documents. In another example, rather than accessing virtual representations of the documents that correspond to classes of terms, the weight assignor component 112 can access or comprise a function that represents a continuous representation of the document 108 over time with respect to alterations of terms in the document (e.g., rates of change of terms in the document 108). Other implementations are also contemplated and intended to fall under the scope of the hereto-appended claims.

With additional formality, language models that can be utilized by the weight assignor component 112 in connection with assigning weights to documents based at least in part upon temporal dynamics corresponding to the documents are described herein. A term counting function can be defined, wherein the subscript j∈{L, M, S} refers to different mixture components:

$$v(q,D_j) = N(q,D)\phi_j(n(q,D)), \quad (3)$$

where $\phi_j \in [0,1]$, $\Sigma_j \phi_j(n)=1$ control the distribution of total term counts across different mixture components. With such a term counting function, mixture component language (language that takes into consideration multiple classifications of terms that change at different rates over time) can be estimated as follows:

$$P(q|D_j) = \frac{v(q, D_j) + \mu_j P(q|C_j)}{|D_j| + \mu_j} \quad (4)$$

where $|D_j| = \Sigma_{w \in D_j} v(q, D_j)$ is the length of a virtual document, $\mu_j$ is a component-specific smoothing parameter (for a particular class of terms), C refers to a collection of documents, and $P(q|C_j)$ is a maximum-likelihood estimate of the collection probability, limited to the j mixture components:

$$P(q|C_j) = \frac{\sum_{D_j} v(q, D_j)}{\sum_w \sum_{D_j} v(w, D_j)},$$

where w is a word in a document collection.

The functions $\phi_i$ enable the distribution of term counts across different mixture components in a varying proportions based on a temporal distribution of a term or frequency vector of the term n(q, D). Furthermore, pursuant to an example, φ can be defined over a number of time slices that a particular term occurs in, c(q, D), and a threshold can be applied to c(q, D) as follows:

$$\phi_L(n) = \begin{cases} 1 & \text{if } c(q, D) \in [0.9 \times T, T] \\ 0 & \text{otherwise} \end{cases}$$

$$\phi_M(n) = \begin{cases} 1 & \text{if } c(q, D) \in [0.5 \times T, 0.9 \times T] \\ 0 & \text{otherwise} \end{cases}$$

$$\phi_S(n) = \begin{cases} 1 & \text{if } c(q, D) \in [0, 0.5 \times T] \\ 0 & \text{otherwise} \end{cases}$$

where T is a total number of time slices in a collection (e.g., 10).

These definitions can produce three language models with non-overlapping vocabulary so that terms occurring in most or all time slices will be present in the $D_L$ language model, terms occurring in some lesser percentage of time slices (e.g., below a threshold percentage) will be present in the $D_M$ language model, and terms occurring in some still yet smaller percentage of time slices (e.g., below another threshold percentage) will be present in the $D_S$ language model. Of course, the above φ functions can be altered to allow a less partitioned set of language models with shared vocabulary across models. For instance, a staying power statistic can be used to identify terms likely to persist in the vocabulary of a document. Moreover, additional, more granular language models can be utilized by the weight assignor component 112 in connection with assigning weights to documents based upon temporal dynamics of the documents.

As can be ascertained, the weight assignor component 112 when utilizing the above language model can have the effect of assigning greater weights to documents that change more than static documents. For instance, two documents A and B can have a substantially similar length, and both documents can include the query term q in all time slices with a substantially similar frequency $v(q, A_L) = v(q, B_L) > 0$. Document A can have a relatively small amount of dynamic content, while document B can have a relatively large amount of dynamic content, such that $|A_L| > |B_L|$ and $|A_M| + |A_S| < |B_M| + |B_S|$. Accordingly, $P(q|A_L) < P(q|B_L)$. Given appropriate settings for parameters in equation (1), so that background models $C_M$ and $C_S$ do not dominate the scoring function, P(Q|A)<P(Q|B). By separating the transient, short-lived vocabulary (terms) in a document from longer-lived vocabulary, the length of the long-term virtual document can be shortened, which increases influence of those terms that are stable across the lifetime of the document.

As indicated above, the weight assignor component 112 can assign weights based upon a query-independent weight, which can be referred to as a document prior. There are numerous mechanisms that can be utilized to establish such a document prior, such as the likelihood of generating a particular document at time t given the language model of documents at time t'<t. In another example, the document prior can be given through use of the following equation:

$$P_{ch}(D) \propto (\text{ShDiff}(D)+1)^\gamma \quad (5)$$

where $\gamma \in [0,1]$ is a parameter to be estimated, $$ShShim(D) = \frac{1}{T-1} \sum_{t=2}^{T} \frac{|Sh(D^t) \cap Sh(D^{t-1})|}{N},$$

$Sh(D^t)$ are sampled shingles in the document D at time t, N is a number of shingles sampled per document, T is a number of time slices in the collection, and $ShDiff(D)=1.0-ShShim(D)$. As $\gamma$ approaches zero, documents are treated substantially similar regardless of their change characteristics; as $\gamma$ approaches one, the prior grows linearly with the volume of document change.

Furthermore, as indicated above, the models utilize various parameters that can be learned: smoothing parameters $\mu_L$, $\mu_M$, and $\mu_S$; mixing weights $\lambda_L$, $\lambda_M$, and $\lambda_S$; and the prior weight $\gamma$. It can be assumed that the smoothing parameters and mixing weights are independent across each of the mixture components (e.g., the three mixture components). Furthermore, the prior parameter $\gamma$ can be independent of the smoothing parameters and mixing weights. Given such assumption, these parameters can be learned for a particular collection. For instance, the parameters can be learned to maximize performance against certain benchmarks, such as NDCG@1.

In summary, the weight assignor component 112 can access a plurality of instances of the document 108 that correspond to different points in time, and can employ a counting function to determine distribution of terms in the document 108 over time. This can be utilized to generate virtual representations of the document 108 for different terms that alter in different manners over time. These virtual representations may be employed to assign a weight to the document 108 that is utilized to rank the document amongst other documents. Parameters used in the language model can be learned.

Figure 4:
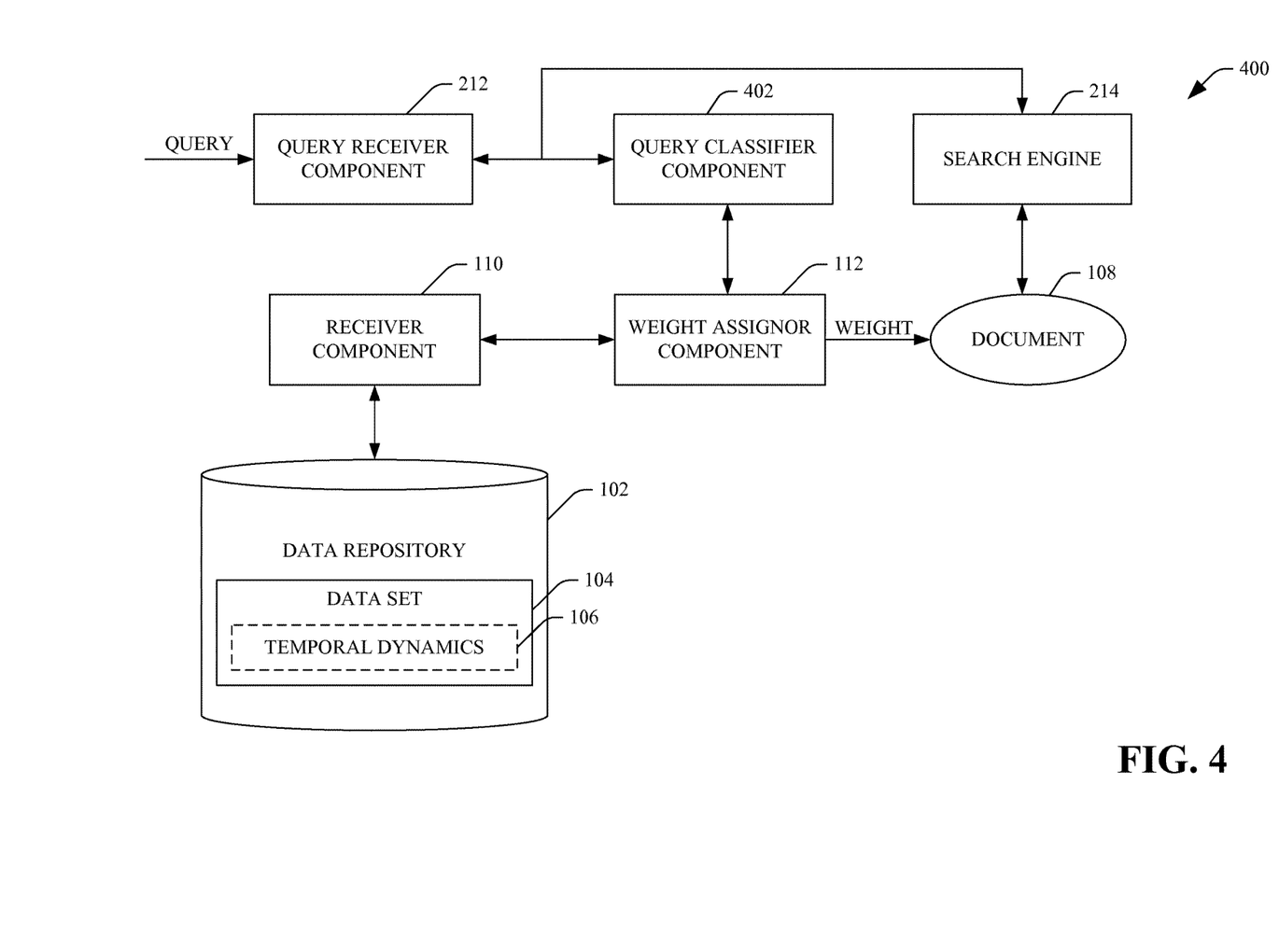
FIG. 4 is a functional block diagram of an example system that facilitates assigning a weight to a document based at least in part upon temporal dynamics pertaining to the document.

Now referring to FIG. 4, an example system 400 that facilitates assigning a weight to a document based at least in part upon temporal dynamics of the document is illustrated. The system 400 includes the data repository 102 that comprises the dataset 104 and corresponding temporal dynamics 106. The query receiver component 212 receives a query that is issued by a user, wherein the user wishes to obtain information pertaining to the query. The system 400 may optionally include a query classifier component 402 that may be in communication with the query receiver component 212 and can assign a classification to the received query. For instance, the query classifier component 402 can classify the query as navigational in nature—where the issuer of the query is attempting to get to a particular page. In another example, the query classifier component 402 can classify the query as information seeking in nature—where the issuer of the query is looking for recent information. The query classifier component 402 can classify the query based upon information included in query logs, upon terms existent in the query, or any other suitable parameter.

The weight assignor component 112 can receive the classification generated by the query classifier component 402 and can assign a weight to the document 108 based at least in part upon the classification (and temporal dynamics corresponding to the document 108). As indicated above, separate models (e.g., three separate models) can be generated for the document 108, and based upon the classification, one of the models can be assigned a greater weight when compared to other models. For instance, if the query classifier component 402 classifies the query as navigational, the weight assignor component 112 can give greater deference to the language model (e.g., virtual document) that includes terms that change infrequently over time. If the query classifier component 402 classifies the query as informational, the weight assignor component 112 can give greater deference to the language model that includes terms that change more frequently over time.

Additionally, the system 400 includes the receiver component 110 that receives the dataset 104 (and the temporal dynamics 106). The weight assignor component 112 is in communication with the receiver component 110 and receives the dataset 104 and temporal dynamics 106, and can assign a weight to the document 108 based at least in part upon the temporal dynamics corresponding to the document 108. Thus, the weight assignor component 112 can assign a weight to the document 108 based at least in part upon temporal dynamics corresponding to the document and a classification assigned to the query.

The search engine 214 is in communication with the query receiver component 212 and receives the query. The search engine 214 can search over a collection of documents based at least in part upon the query. Each of the documents in the collection of documents can be assigned a weight by the weight assignor component 112, and the search engine 214 can output a ranked list of search results based at least in part upon the assigned weights. For example, the search engine 214 can rank the document 108 with respect to at least one other document based at least in part upon the assigned weights.

Figure 5:
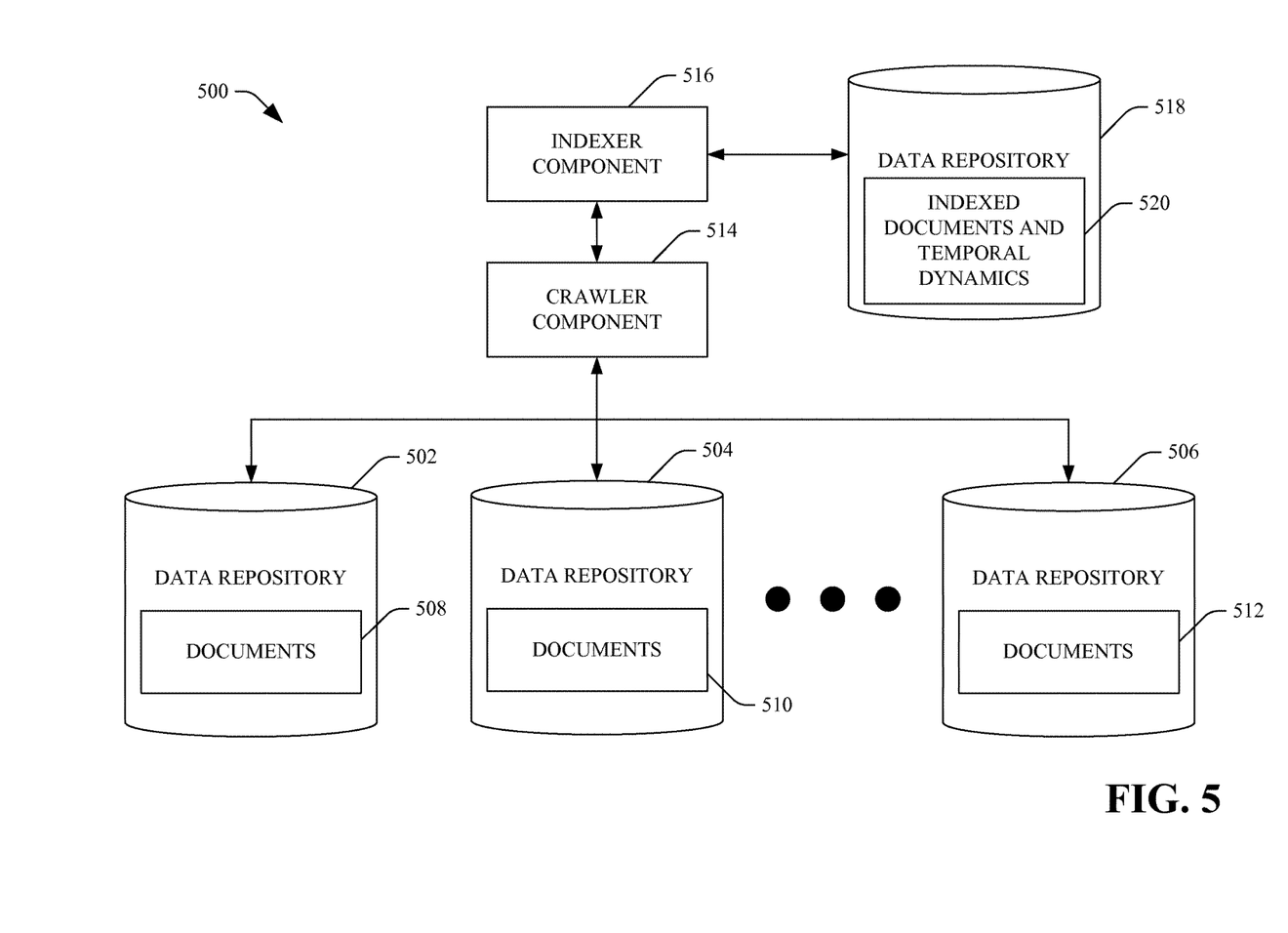
FIG. 5 is a functional block diagram of an example system that facilitates obtaining and indexing documents and temporal dynamics corresponding thereto.

Now referring to FIG. 5, an example system 500 that facilitates crawling and indexing documents is illustrated. The system 500 includes a plurality of data repositories 502-506. For instance, the data repositories 502-506 can be included in a plurality of web servers. The data repositories 502-506 can include a plurality of documents 508-512. These documents can be HTML documents or other suitable documents that can be searched over through use of a web browser.

The system 500 additionally includes a crawler component 514 that can be configured to obtain and categorize the documents 508-512 for utilization by a search engine. For instance, the crawler component 514 can be configured to periodically crawl over the documents 508-512 and capture instances of the documents at different points in time. These instances may then be utilized by the weight assignor component 112 to assign weights to each of the documents 508-512. In another example, the crawler component 514 can be configured to crawl at least some of the documents 508-512 upon receipt of an indication that a document has been subject to an alteration (e.g., a new version of a document has been placed on one of the data repositories 502-506).

The system 500 further includes an indexer component 516 that can index documents crawled by the crawler component 514 to facilitate efficient retrieval of documents by the search engine. For example, the indexer component 516 can index documents based upon an amount of alteration that has occurred in the documents. Accordingly, the indexer component 516 can cause documents and/or instances of documents and temporal dynamics 518 corresponding thereto to be retained in a data repository 520. The weight assignor component 112 can have access to the data repository 520 and can assign weights to the documents crawled by the crawler component 514 and indexed by the index component 516.

Figure 6:
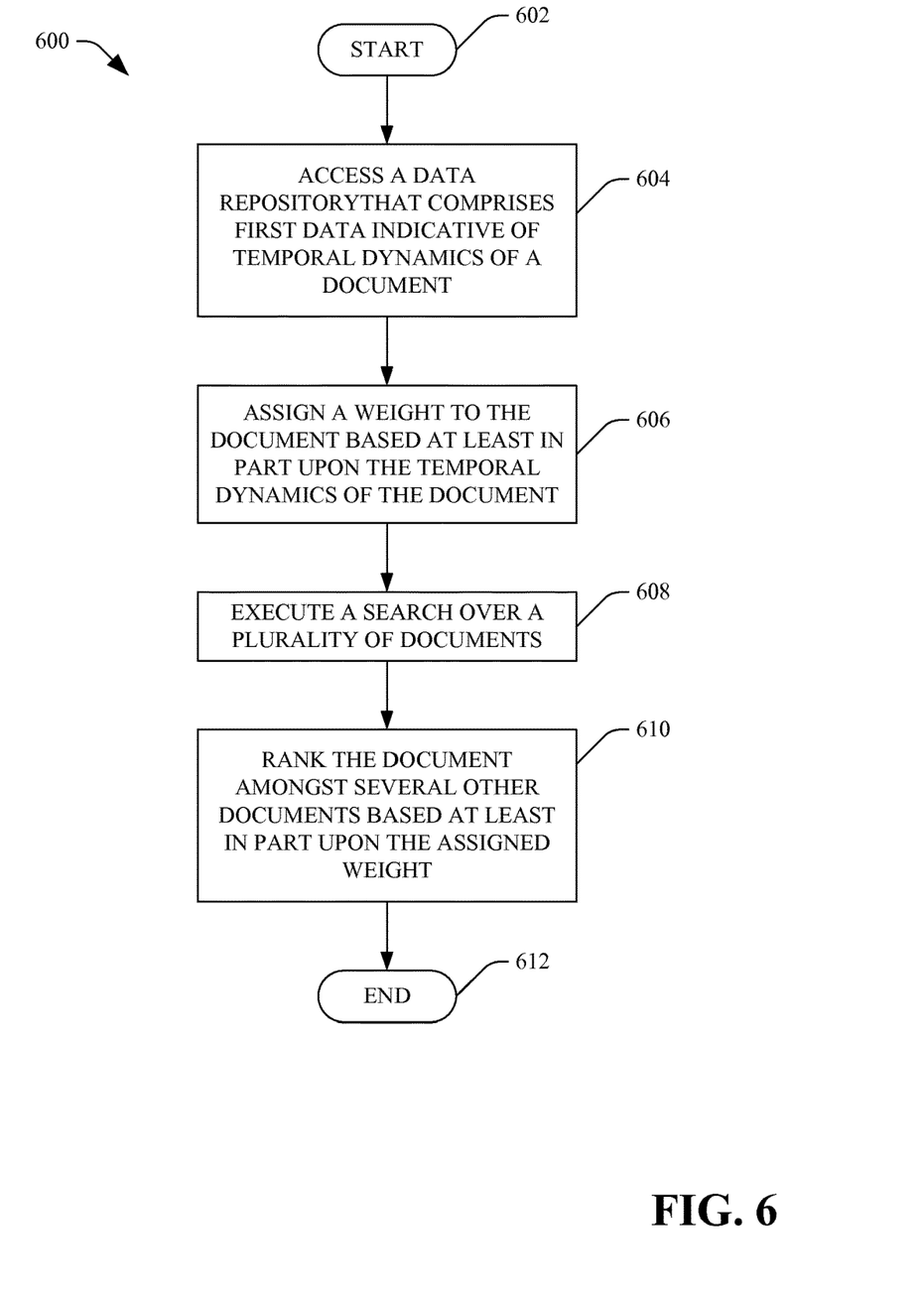
FIG. 6 is a flow diagram that illustrates an example methodology for ranking documents based at least in part upon temporal dynamics corresponding thereto.
Figure 7:
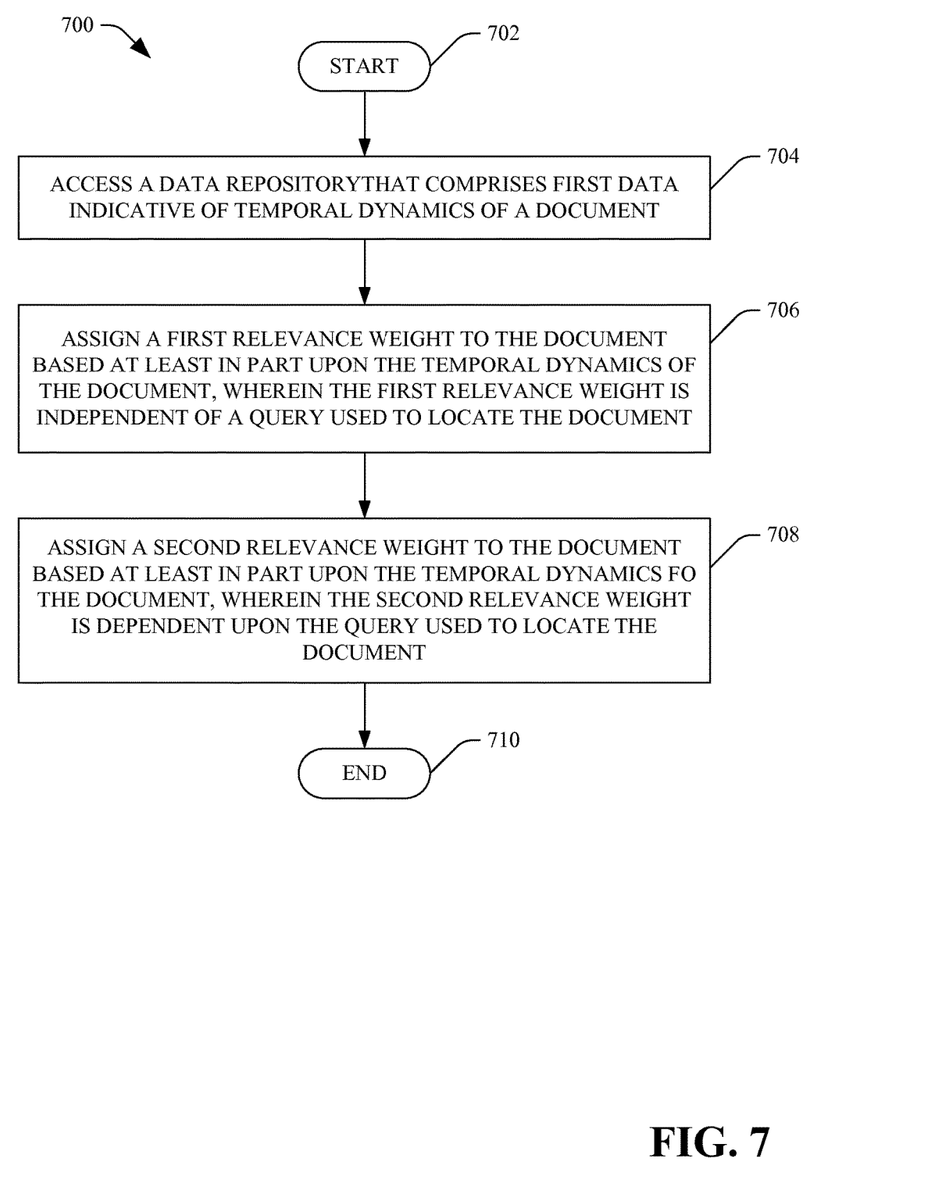
FIG. 7 is a flow diagram that illustrates an example methodology for assigning weights to a document that can be employed in connection with ranking the document with respect to other documents.

With reference now to FIGS. 6-7, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 6, a methodology 600 that facilitates assigning a weight to a document is illustrated. The methodology 600 begins at 602, and at 604 a data repository is accessed. The data repository includes first data that is indicative of temporal dynamics of a document that is accessible by way of querying a search engine. As indicated above, the temporal dynamics of the document comprise an alteration of at least one term corresponding to the document over time, wherein the first data comprises an identity of the at least one term.

At 606, a weight is assigned to the document based at least in part upon the temporal dynamics of the document and the identity of the at least one term, wherein the weight is indicative of relevance of the document with respect to at least one other document. In an example, rather than being assigned to an entirety of the document, the weight can be assigned to a portion of the document (e.g., a particular field in a web page). Furthermore, the weight can be based at least in part upon a classification of a query.

At 608, a search is executed over a plurality of documents with respect to at least one query. For instance, a query can be issued to a search engine by a user, and the search engine can execute a search over a plurality of documents based at least in part upon the at least one query. At 610, the document is ranked with respect to at least one other document based at least in part upon the weight assigned to the document at 606. The methodology 600 completes at 612.

With reference now to FIG. 7, an example methodology 700 that facilitates assigning relevance weights to documents is illustrated. The methodology 700 starts at 702, and at 704 a data repository is accessed, wherein the data repository comprises first data that is indicative of temporal dynamics of a document.

At 706, a first relevance weight is assigned to a document retrievable by a search engine. The first relevance weight can be independent of a query executed by the search engine to search over a plurality of documents (e.g., a document prior), and the first relevance weight can be assigned based at least in part upon temporal dynamics pertaining to the document.

At 708, a second relevance weight is assigned to the document. The second relevance weight is dependent upon contents of the query executed by the search engine (e.g., one or more terms in the query or a classification of the query). Furthermore, the second relevance weight can be based at least in part upon temporal dynamics of a specific term in the document, wherein the first relevance weight and the second relevance weight are utilized by the search engine to rank the document with respect to at least one other document upon executing the query.

Figure 8:
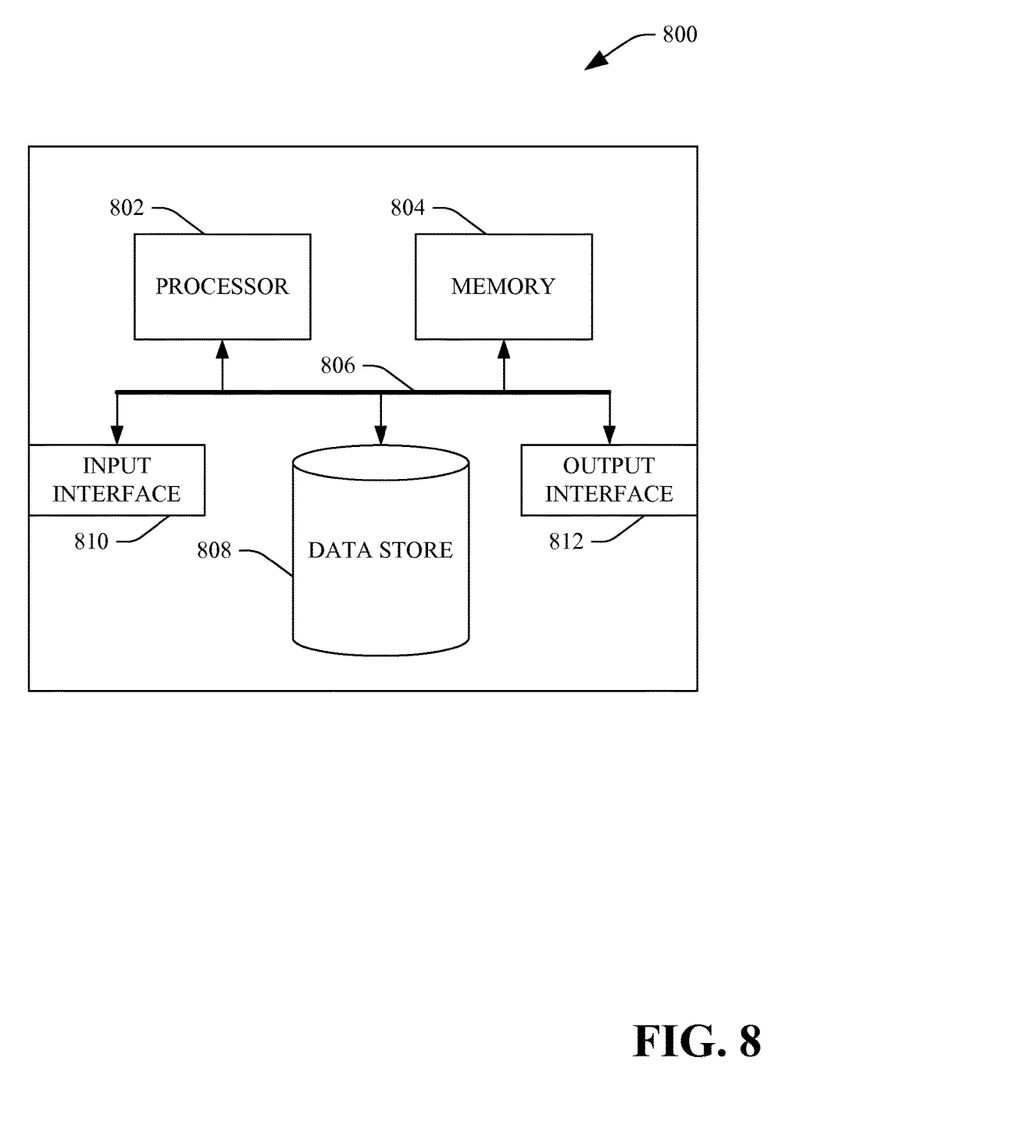
FIG. 8 is an example computing system.

Now referring to FIG. 8, a high-level illustration of an example computing device 800 that can be used in accordance with the systems and methodologies disclosed herein is illustrated. For instance, the computing device 800 may be used in a system that supports assigning weights to documents based at least in part upon temporal dynamics corresponding to the documents. In another example, at least a portion of the computing device 800 may be used in a system that supports searching over a plurality of documents that have weights assigned thereto, wherein the weights are based at least in part upon temporal dynamics corresponding to the document. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store weights, parameter values, documents, etc.

The computing device 800 additionally includes a data store 808 that is accessible by the processor 802 by way of the system bus 806. The data store 808 may include executable instructions, weights, parameter values, documents, instances of documents, temporal dynamics information, etc. The computing device 800 also includes an input interface 810 that allows external devices to communicate with the computing device 800. For instance, the input interface 810 may be used to receive instructions from an external computer device, such as a web server, a desktop computer, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method performed by at least one computing device that executes a search engine, the method comprising:
 receiving, via an input interface of the search engine, a query that comprises a term;
 classifying the query as being a navigational query rather than a seeking query;
 assigning a relevance weight to a document based upon:
  a term classification assigned to the term in the document, the term classification being representative of a length of time that the term has been present in the document over a window of time; and the query being classified as a navigational query rather than a seeking query,
wherein the relevance weight is indicative of relevance of the document with respect to the query; and
causing a ranked list of search results to be presented on a display responsive to assigning the relevance weight to the document, the ranked list of search results comprises the document, wherein a position of the document in the ranked list of search results is based upon the relevance weight assigned to the document.

2. The method of claim 1, further comprising:
assigning a second weight to the document that is independent of the query; and
assigning the relevance weight to the document based upon the second weight.

3. The method of claim 1, further comprising:
responsive to receiving the query, retrieving first data, the first data includes a first mixture component and a second mixture component, the first mixture component comprises a first plurality of terms that have a rate of change in the document above a first threshold, the second mixture component comprises a second plurality of terms that have a rate of change in the document below the first threshold, the term included in the first plurality of terms of the first mixture component; and
assigning the relevance weight to the document based upon the term being included in the first plurality of terms of the first mixture component.

4. The method of claim 3, wherein the first data includes a function that represents a continuous representation of the document over time with respect to rates of changes of terms in the document.

5. The method of claim 1, wherein the term is in a body of the document, the method further comprising assigning the relevance weight to the document based upon the term being included in the body of the document.

6. The method of claim 1, wherein the term is in anchor text of the document, the method further comprising assigning the relevance weight to the document based upon the term being in the anchor text of the document.

7. The method of claim 1, further comprising assigning the relevance weight to the document based upon identities of portions of the document that have altered over time.

8. The method of claim 1, further comprising assigning the relevance weight to the document based upon a change of position of the term in the document over time.

9. The method of claim 1, the method further comprising:
generating a first language model for the document, the first language model comprises terms that occur in instances of the document above a threshold frequency, the instances of the document corresponding to respective different points in time;
generating a second language model for the document, the second language model comprising terms that occur in the instances of the document at or below the threshold frequency, terms in the first language model and terms in the second language model being non-overlapping; and
assigning the relevance weight to the document based upon the term being in the first language model rather than the second language model.

10. The method of claim 9, further comprising:
assigning a first weight to the first language model based upon the query being classified as navigational;
assigning a second weight to the second language model based upon the query being classified as navigational; and
assigning the relevance weight to the document based upon the first weight assigned to the first language model and the second weight assigned to the second language model.

11. The method of claim 1, wherein the term classification is additionally indicative of when the term was first introduced into the document in the window of time.

12. A method performed by at least one computing device that executes a search engine, the method comprising:
receiving, via an input interface of the search engine, a query that comprises a term;
generating a first language model for a document, the first language model comprises terms that occur in instances of the document above a threshold frequency, the instances of the document corresponding to respective different points in time;
generating a second language model for the document, the second language model comprising terms that occur in the instances of the document at or below the threshold frequency, terms in the first language model and terms in the second language model being non-overlapping; and
classifying the query as being navigational in nature;
assigning a first weight to the first language model based upon the query being classified as navigational;
assigning a second weight to the second language model based upon the query being classified as navigational;
assigning a relevance weight to the document based upon:
a term classification assigned to the term in the document, the term classification being representative of a length of time that the term has been present in the document over a window of time;
the term being in the first language model rather than the second language model; and
the first weight assigned to the first language model and the second weight assigned to the second language model, wherein the relevance weight is indicative of relevance of the document with respect to the query; and
causing a ranked list of search results to be presented on a display responsive to assigning the relevance weight to the document, the ranked list of search results comprises the document, wherein a position of the document in the ranked list of search results is based upon the relevance weight assigned to the document.

13. A system comprising:
at least one processor; and
memory that comprises instructions that, when executed by the at least one processor, cause the at least one processor to perform acts comprising:
receiving a query, the query comprising a term, wherein a search engine is configured to search over documents based upon the query;
assigning a classification to the query that indicates that the query is navigational;
assigning a relevance weight to a document in the documents, the relevance weight based upon:
the term being included in both the query and the document;
a classification assigned to the term in the document, the classification indicative of a length of time that the term has existed in the document over a window of time; and
the classification assigned to the query; and
causing a ranked list of search results to be presented on a display, wherein the search engine outputs the ranked list of search results based upon the query, and further wherein the document is positioned in the ranked list of search results based upon the relevance weight assigned to the document.

14. The system of claim 13, wherein the acts are performed by a web-based search engine.

15. The system of claim 13, wherein the acts are performed by a client application configured for execution on a personal computing device or an enterprise search tool.

16. The system of claim 13, the acts further comprising assigning the relevance weight to the document based upon rates of change of portions of the document over time.

17. The system of claim 13, the acts further comprising accessing a dataset responsive to receipt of the query, the dataset comprises:
   representations of the document at different times over a period of time;
   a first language model that comprises terms that occur in the representations of the document above a threshold frequency over the period of time; and
   a second language model that comprises terms that occur in the representations of the document at or below the threshold frequency over the period of time, the acts further comprising assigning a first weight to the first language model and a second weight to the second language model, the first weight and the second weight are different, the relevance weight assigned based upon the first weight and the second weight.

18. The system of claim 13, the classification being further indicative of how recently the term was introduced in the document.

* * * * *